C. A. A. RAND.
STRIPPER HARVESTER.
APPLICATION FILED NOV. 14, 1908.
925,945.
Patented June 22, 1909.
4 SHEETS—SHEET 1.
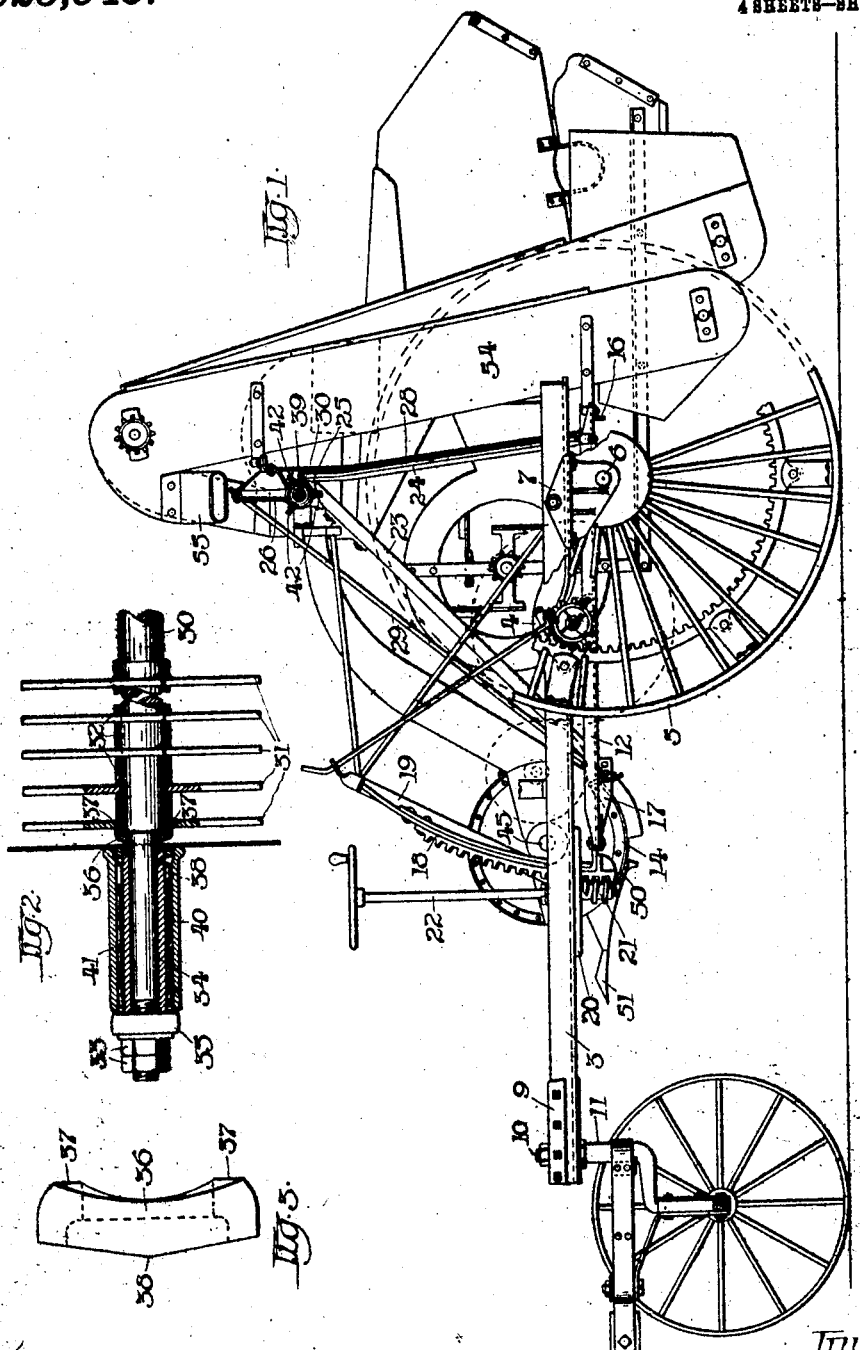
Witnesses:
F. W. Hoffmeister
Thos. Kiely
Inventor:
Charles A. Anderson Rand
By E. M. Burgess
Attorney

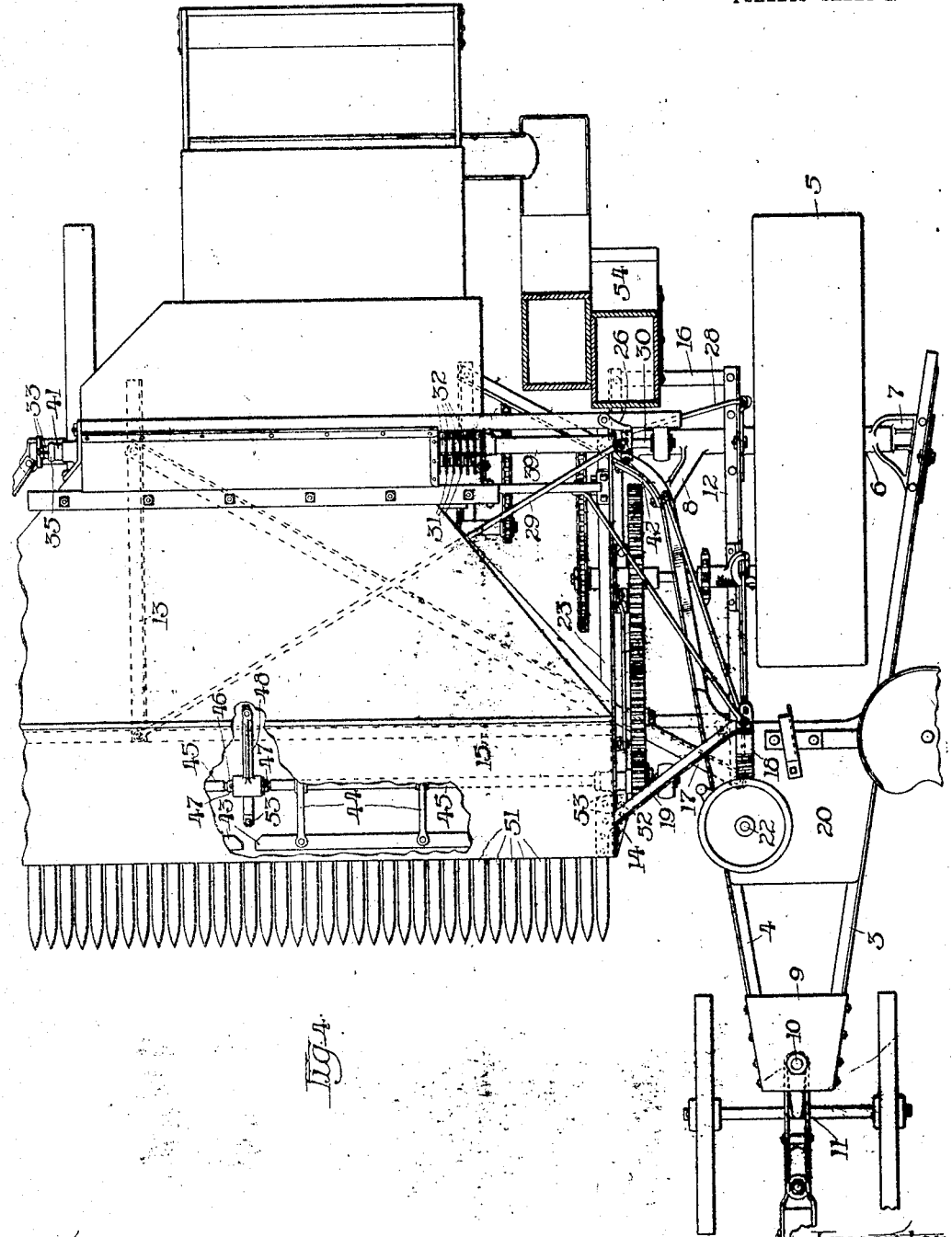

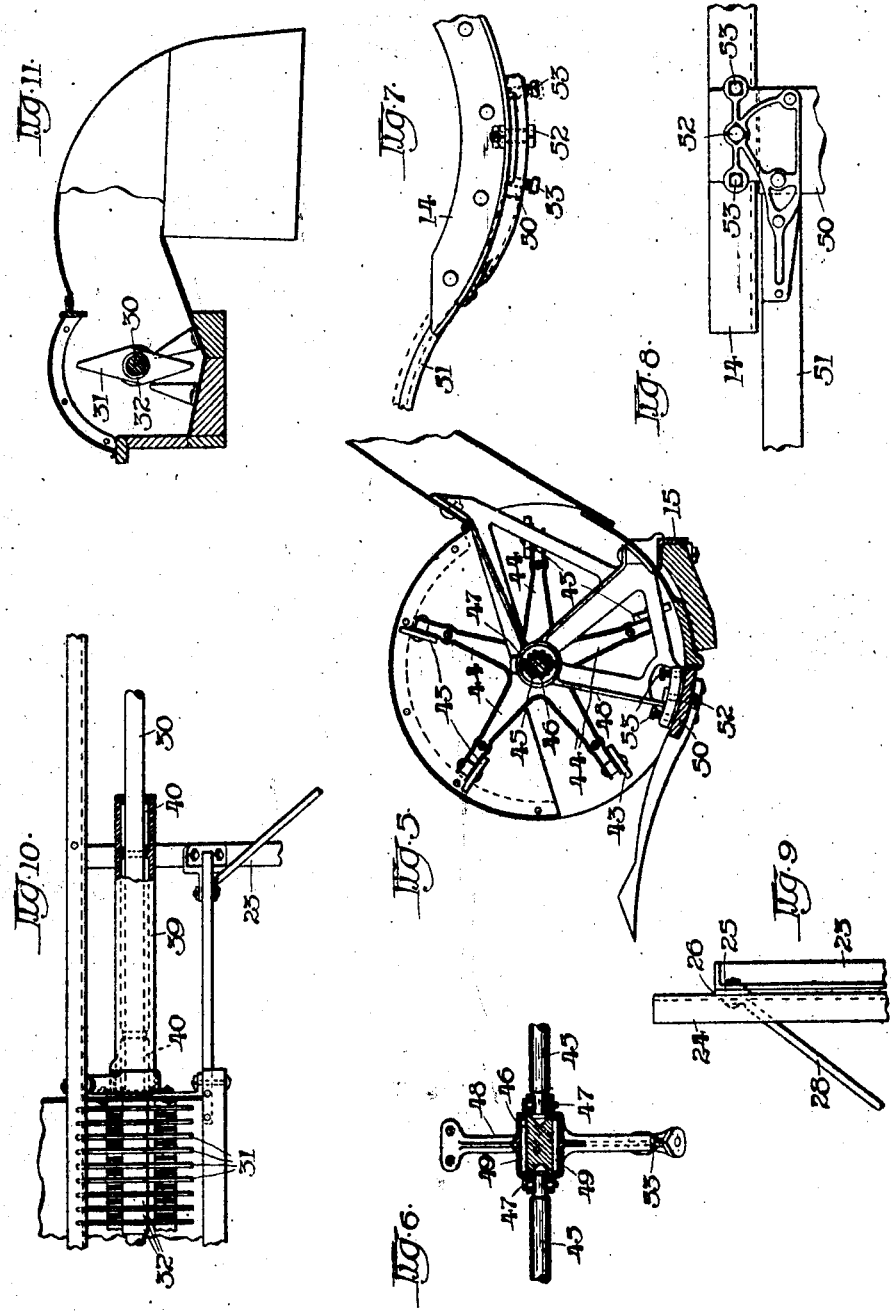

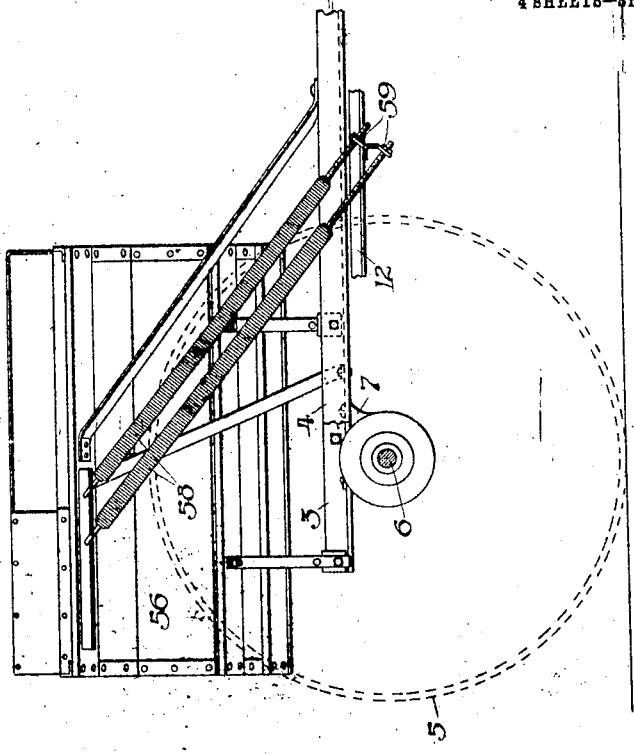
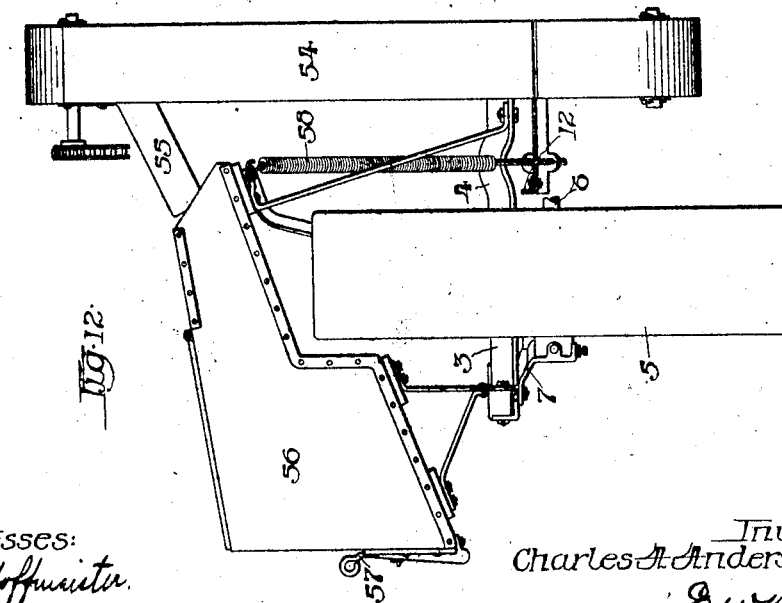

UNITED STATES PATENT OFFICE.

CHARLES A. ANDERSON RAND, OF CHICAGO, ILLINOIS, ASSIGNOR TO INTERNATIONAL HARVESTER COMPANY, A CORPORATION OF NEW JERSEY.

STRIPPER-HARVESTER.

No. 925,945.　　　　　Specification of Letters Patent.　　　Patented June 22, 1909.

Application filed November 14, 1908. Serial No. 462,696.

*To all whom it may concern:*

Be it known that I, CHARLES A. ANDERSON RAND, a citizen of the United States, residing at Chicago, in the county of Cook and State of Illinois, have invented certain new and useful Improvements in Stripper-Harvesters, of which the following is a specification, reference being had to the accompanying drawings, forming a part thereof.

My invention relates to that class of harvesting machines commonly called stripper harvesters, in the operation of which the heads of the grain are stripped from the stalks and elevated to a threshing, separating and cleaning mechanism and the grain delivered to a receiving receptacle.

The objects of the invention are to improve the construction of the frame structure in a manner to render it adjustable when required and rigid and strong while in operation; to provide a two-part or flexible shaft upon which the stripping cylinder is mounted; to provide an improved journal support for the threshing cylinder; to an improved construction of the threshing cylinder whereby the shaft upon which it is mounted is arranged in proper alinement, and to reduce the cost of the machine by means of its simplified construction. These objects are attained by the mechanism illustrated by the drawings and described in the specification.

Referring to the drawings, in which like reference numerals designate the same parts throughout the several views—Figure 1 is a side elevation of a harvester embodying my improvements; Fig. 2 is a detail drawing, partly in section, and designed to illustrate the construction of the threshing cylinder; Fig. 3 is a detail drawing of a cam washer forming a part of the alining mechanism of the shaft upon which the threshing cylinder is mounted; Fig. 4 is a top plan view of the machine showing the construction of the main frame and the manner of mounting the stripping and threshing cylinders; Fig. 5 is a sectional end view of the stripping cylinder designed to illustrate the manner of adjusting the stripper bar relative to the rotatable cylinder; Fig. 6 is a detail drawing, partly in section, and designed to illustrate the construction of the flexible shaft upon which the stripping cylinder is mounted; Fig. 7 is an enlarged detail showing the manner of constructing the adjusting mechanism between the stripper bar and the main frame members at opposite ends of the bar; Fig. 8 is a bottom view of Fig. 7; Fig. 9 is a detail drawing of part of the frame structure; Fig. 10 is a fragmental detail, partly in section, and designed to illustrate the manner of mounting the journal of the threshing cylinder; Fig. 11 is a detail, partly in section, and designed to illustrate the construction of the threshing cylinder; Fig. 12 is a rear elevation of a part of the machine and illustrating the manner of mounting the grain receptacle and its yielding connection with the wheel frame; and Fig. 13 is a side elevation of Fig. 12.

The draft, or main wheel frame, consists, in part, of the frame-bars 3 and 4, located upon opposite sides of the main wheel 5 that is journaled upon an axle 6. The frame-bars 3 and 4 are secured at their rear ends to parts 7 and 8 that are supported on the axle 6 and extending forward in converging lines, are connected at their forward ends to a spacing bracket 9, in which is secured a vertical stem 10 forming part of a pole truck 11. Below the wheel frame, and supported upon the axle, is a tilting bed frame having outside members 12 and 13 and an intermediate member 14 extending in the direction of the draft of the machine and front and rear cross sills 15 and 16 secured thereto, and a diagonal member 17 extending from the grainward member 13 in proximity to the axle and joined to the forward end of the stubbleward member 12. A sector-rack 18, concentric with the axle 6, is secured at its lower end to the forward end of the frame member 12 and has its upper end connected with the rear end thereof by means of a brace rod 19.

A plate member 20 is secured to the converging wheel frame bars and forms a guide for the tilting sector-rack and also a support for a worm 21, operatively connected with the sector-rack and having a vertical crank shaft 22 whereby it may be operated in a manner to tilt the machine as desired. Upon the tilting frame is arranged a vertical frame having upwardly converging bars 23 and 24 that are secured at their lower ends to the bed frame members and at their upper ends to an ear 25 forming part of a casting 26, that is provided with an opening adapted to receive the outer end of the sleeve 27 in which the threshing cylinder shaft is journaled. A brace rod 28 is connected at its upper end to said casting, and its lower end is adjustably connected with the bed frame, whereby the vertically arranged frame may be adjusted in a grainward or stubbleward direction.

A brace rod 29 is connected at its upper end with the casting 26, and extending diagonally downward, forward and grainward, has its opposite end connected to the frame member of the tilting bed frame, whereby the grainward end of said frame is prevented from sagging and, by means of the adjustable connection of the rod 28 with the bed frame, the parts may be adjusted as desired for the purpose of arranging the operative parts in proper relation with each other.

The threshing cylinder consists of a supporting shaft 30, upon which is mounted a series of angular plates 31, having axial openings adapted to receive the shaft, the plates being spaced apart by means of short thimbles 32, and 33 represent threaded clamping members that, in combination with a sleeve 34 and washer 35, operate to draw the plates and thimbles closely together in operative relation and to prevent distortion of the shaft, and for the purpose of maintaining it in proper alinement when the parts are drawn together, there is provided an equalizing cam washer 36 intermediate the sleeve 34 and the adjacent plate that is adapted to rock relative to the axis of the shaft upon its oppositely arranged bearing points 37 and 38, as shown in Fig. 3, in a manner to equalize the strain of the nuts and prevent any distortion of the shaft. The shaft is journaled in a sleeve 39 that is provided at opposite ends thereof with roller bearings 40, the sleeve being mounted at its grainward end in a bracket 41 secured to the supporting frame, and its stubbleward end is received by an opening in the casting 26; and 42 designates radially arranged set screws that are received by the casting 26 in a manner to cause the inner ends to contact with said sleeve whereby it may be adjusted relative to said casting as desired to maintain the cylinder in proper operative relation with its associated parts.

The stripping cylinder consists of the usual shearing blades 43 secured to the outer ends of spiders 44 that are secured to a flexible driving shaft 45, having its outer end journaled in bearings secured to the tilting frame of the machine. In the construction of machines of the type indicated the practice has been to provide a continuous one-piece shaft supported in bearings at its opposite ends, upon which the spiders and shearing blades have been mounted, with the result that when in operation there would be more or less flexing of the shaft between its bearings, which materially affected its efficiency of operation, and this evil would be aggravated in machines having a wide cut. To remedy the defect there is provided a supporting shaft that is jointed at its middle portion in a manner to allow it to conform itself to any disarrangement of the associated parts of the stripping mechanism. As illustrated in Fig. 6, the shaft consists of two parts, having their inner ends reduced in diameter and loosely received by axial openings at opposite ends of a bearing member 46, to which they are connected by means of pins 47. The bearing member is journaled in a supporting bracket 48, that is secured to the bed frame, and 49 represents anti-friction rollers forming part of the journal bearing. A shearing bar 50, having stripping fingers 51 secured thereto, is mounted in proper operative relation with the shearing blades of the stripping cylinder by means of a central securing bolt 52 engaging with the bar and the supporting bracket, as illustrated in Figs. 5 and 7. 53 represents set screws that are received by the brackets and having their inner ends contacting with said bar, whereby they may be manipulated in a manner to adjust the bar bodily and radially toward or from the axial line of the stripping cylinder for the purpose of maintaining the associated parts of the stripping mechanism in proper operative relation.

The threshed grain is received from the separating mechanism by the lower end of an elevating chute 54, from which it is delivered into a conducting spout 55, which delivers it into a grain receiver 56, which is provided with a hinged gate 57 adapted to be controlled in a manner to empty the receiver of its contents in sacks as desired. The grain receiver is mounted upon the tilting frame of the machine and is connected with the wheel frame by means of a pair of counterbalancing springs 58 that extend diagonally forward and downward, as shown in Fig. 13, and operate to assist the operator in controlling the position of the two frames relative to each other. The tension of the springs may be adjusted by means of nuts 59.

What I claim as my invention, and desire to secure by Letters Patent, is:

1. In a stripper harvester, the combination of a stripping cylinder, said stripping cylinder including a two-part driving shaft journaled in bearings at opposite ends thereof, a bearing intermediate the ends of said shaft, said shaft having its inner ends flexibly connected adjacent said bearing.

2. In a stripper harvester, the combination of a stripping cylinder, said stripping cylinder including a two-part driving shaft journaled in bearings at opposite ends thereof, a bearing intermediate the ends of said shaft, a bearing member journaled in said bearing, said two-part shaft having its inner ends flexibly connected with opposite ends of said bearing member.

3. In a stripper harvester, the combination of a stripping cylinder, said stripping cylinder including a two-part driving shaft journaled in bearings at opposite ends thereof, a bearing intermediate the ends of said shaft, a bearing member journaled in said bearing, axial openings at opposite ends of said bearing member, said two-part shaft having its inner ends reduced in diameter, and said reduced ends received by said axial openings and flexibly connected with said bearing member.

4. In a stripper harvester, the combination of a stripping cylinder, said stripping cylinder including shearing blades and a two-part driving shaft, said shaft journaled in bearings at opposite ends thereof, a bearing intermediate the ends of said shaft, said shaft having its inner ends flexibly connected adjacent said bearing, a shearing bar arranged to coact with said shearing blades, and means for adjusting said bar bodily toward and from the axis of said cylinder, said adjusting means being arranged adjacent each bearing in which said shaft is journaled.

5. In a stripper harvester, the combination of a wheel frame, a tilting frame arranged to rock about the axis of said wheel frame, said tilting frame including bed frame members and a vertically arranged frame mounted upon said bed frame at one side of the machine, an adjustable connection between the upper end of said vertical frame and the stubbleward side of said bed frame, and a brace rod extending from the upper end of said vertical frame downward, forward and grainward to the opposite side of said bed frame.

6. In a stripper harvester, the combination of a main carrying wheel, a wheel frame in which said wheel is mounted, a tilting frame arranged to rock about the axis of said wheel frame, threshing and separating mechanism a grain receiver mounted upon said tilting frame at the stubbleward side of said wheel and adapted to receive the grain from the threshing and separating mechanism arranged upon the opposite side of said wheel, and a counterbalancing spring mechanism connecting said grain receiver with the forward end of said wheel frame.

CHARLES A. ANDERSON RAND.

Witnesses:
J. C. WARNES,
F. W. HOFFMEISTER.